US007664339B2

(12) United States Patent
Turski

(10) Patent No.: US 7,664,339 B2
(45) Date of Patent: Feb. 16, 2010

(54) IMAGE PROCESSING METHOD FOR OBJECT RECOGNITION AND DYNAMIC SCENE UNDERSTANDING

(76) Inventor: Jacek Turski, 5135 Grape St., Houston, TX (US) 77096

( * ) Notice: Subject to any disclaimer, the term of this patent is extended or adjusted under 35 U.S.C. 154(b) by 763 days.

(21) Appl. No.: 11/120,607

(22) Filed: May 3, 2005

(65) Prior Publication Data

US 2005/0244059 A1 Nov. 3, 2005

Related U.S. Application Data

(60) Provisional application No. 60/567,738, filed on May 3, 2004.

(51) Int. Cl.
*G06K 9/36* (2006.01)
(52) U.S. Cl. ........................ 382/280; 708/405; 702/77; 370/210; 345/427
(58) Field of Classification Search ................. 382/100, 382/276, 279, 280, 281, 210; 708/403, 404, 708/405, 821; 702/77; 370/210; 345/427, 345/604, 645, 70
See application file for complete search history.

(56) References Cited

U.S. PATENT DOCUMENTS

| 5,579,444 | A  | * | 11/1996 | Dalziel et al.    | 700/259 |
| 5,911,035 | A  | * | 6/1999  | Tsao              | 706/16  |
| 6,282,300 | B1 | * | 8/2001  | Bloom et al.      | 382/100 |
| 6,430,431 | B1 | * | 8/2002  | De Yoe            | 600/410 |
| 6,704,869 | B2 | * | 3/2004  | Rhoads et al.     | 713/176 |
| 7,054,850 | B2 | * | 5/2006  | Matsugu           | 706/48  |
| 2003/0039377 | A1 | * | 2/2003 | Rhoads et al.    | 382/100 |
| 2004/0218815 | A1 | * | 11/2004 | Iizuka          | 382/209 |
| 2007/0019884 | A1 | * | 1/2007 | Jojic et al.     | 382/284 |

OTHER PUBLICATIONS

Peters, It et al.: "Centering Peripheral Features in an Indoor Environment Using a Binocaler Log-Polar 4DOF Camera Head:" Robotics and Autornous Systems vol. 18, pp, 271-281: 1996.
Bernardino et al.; "A Binocular Stereo Algorithm for Log-polar Foveated Systems;" 2nd Workshop on Biological Motivated Computer Vision; Tuebingen, Germany; Nov. 2002,.

(Continued)

*Primary Examiner*—Anand Bhatnagar
(74) *Attorney, Agent, or Firm*—Gregory K. Goshorn; Greg Goshorn, P.C.

(57) ABSTRACT

Provided is a method for digital image representation based upon Discrete Projective Fourier Transform (DPFT) constructed in the noncompact (DNPFT) and compact (DCPFT) realizations of geometric Fourier analysis on SL(2,C) groups. Novel characteristics are that the model is well adapted to perspective image transformations and well adapted to the retinotopic (conformal) mapping of the biological visual system. To compute the DPFT of a digital image by Fast Fourier transform (FFT), an image is re-sampled with a non-uniform log-polar sampling geometry. A "deconformalization" procedure corrects the "conformal lens optics" of the conformal camera to render image perspective transformations. DNPFT computes the convolution in the noncompact realization defined over 2-dimensional rotations in the image plane and dilations while the DCPFT computes the convolution in the compact realization (which is defines over all 3-dimensional rotations) and therefore provides basis for developing projectively invariant under all rotations object matching.

17 Claims, 11 Drawing Sheets

OTHER PUBLICATIONS

Traver et al.; "Designing the Lattice or Log-Polar Images;" DGCI 2003 LNCS 2886; pp. 164-173, 2003.
Turski; "Harmonic Anatysis on SL(2,C) and Projectively Adapted Pattern Representation;" Journie of Fourier Analysis and Applications: vol, 4, pp. 67-91; 1998.
Turski; "Geometric Fourier Analysis tor Computation Vision," Journal of Fourier Analysis and Applications: ISSN 1069-5869; © 2004.
Bernardino at al.; "Foveated Active Tracking with Redundant 2D Motion Parameters;" Robotics and Autonomous Systems 39, pp. 205-221; 2002.
Turski; "Projective Fourier Anaiysis for Patterns;" Pattern Recognition 33 pp. 2033-2043, 2000.
Turski; "Geometric Fourier Analysis of the Conformal Camera for Active Vision:" SIAM Review, vol. 46, pp. 230-265; 2004.
Pardo et al.; "Design of a Foveated Log-Polar Image Sensor in Standard CMOS Technology;" Design of Itegratad Circuits end Systems, pp. 1-6. Spain, 1996,.
Ho et al.: "Sensor Geometry and ampling Methods for Space-Variant Image Processing;" Pattern Analysis & Applications; pp. 369-384, 2002.
Ferrari et al.: "Space Varieant Imaging;" Sensor Review. vol. 15. n. 2, pp. 17-20, 1995.
Turski; "Projective Fourier Analysis in Computer Vision: Theory and Computer Simulations;" SPIE, Vol. 3168, pp. 124-135, 1997.

* cited by examiner

400

$\phi = 30°$

450

$\phi = 67°$

IMAGE PROCESSING METHOD FOR OBJECT RECOGNITION AND DYNAMIC SCENE UNDERSTANDING

CROSS-REFERENCE TO RELATED APPLICATIONS

The present application is related to and claims the benefit of the filing date of the following provisional application with a common inventor, which is hereby incorporated by reference:

U.S. Provisional Patent Application Ser. No. 60/567,738, filed May 3, 2004, titled "Image Processing Method for Object Recognition and Dynamic Scene Understanding."

BACKGROUND OF THE INVENTION

1. Technical Field

The invention relates generally to a method of representing and manipulating images and, more specifically to processing digital images in a manner that is both biologically motivated and conductive to computer vision system performing artificial intelligence tasks such as recognition and identification of patterns and man-made objects and understanding of dynamic scenes.

2. Description of the Related Art

Appendix A, included below, is a list of references referred to throughout this Specification by means of a number within square brackets, e.g. "[1]".

Computers have dramatically changed the way society processes information. An important aspect of computer information processing is the task of object recognition, a subset of computer vision. Although great strides have been made in computer object recognition, in an active vision situation, the human visual system with its efficiency in the amount of information needed to be processed to isolate an object from the background and recognize the object in a perspectively-independent way, is far more sophisticated than any contemporary computer vision system. Computer visions systems are also referred to as "active vision systems" and consist of such components as moving camera heads, a hardware image processor, and an image-analyzing computer. In fact, if the human visual system were to store, process and analyze pictorial information in the same way as most computer systems, the size of the brain would have to be at least 5,000 pounds. Moreover, a computer system, which performs pattern recognition tasks, has trouble recognizing an image that has undergone a perspective transformation. For example, if a computer vision system has stored a particular watermark for document verification purposes, a document presented for verification typically must be situated in one of a few specific orientations and can not be viewed from different vantage points.

These aspects of computer recognition relate in particular to robotic vision problems. Issues of perspective and conformal transformations arise in this context of active vision systems. Perspective image transformations arise, for example, when a mobile robotic system, for example, enters a room through one door, records and stores a particular painting on the wall and, then exits the room and reenters through a different door. In this situation, the robot has trouble recognizing the painting and, thus, orienting itself with respect to the painting.

Conformal image transformations arise when modeling a biological visual system, which is highly desirable model for active vision systems. Experimental evidence points to a one-to-one retinotopic mapping from the retina of the eye (consisting of light-sensitive cells with the highest density around the fovea and decreasing density concentrically away for the fovea, based upon viewing angle) to the visual cortex on the back of the brain (consisting of a constant density of cells). This transformation can be modeled by a complex logarithm, a conformal transformation designed by evolution to account for the foveal magnification and nice behavior under scaling and rotation transformations. Both properties result in a few orders of magnitude savings in the amount of the pictorial information processed by the brain's visual pathway. In log-polar coordinates such transformations are represented by translations.

There exist several hardware and software systems for obtaining log-polar images. One approach is to use software to transform a typical Cartesian image from a standard camera, using transformation equations between the retinal plane and the Cartesian plane. This approach is very computationally time-consuming if the images must be processed in order to perform any other task. A second approach is a pure-hardware approach, i.e. the log-polar transformation is made directly from a sensor with a log-polar pixel distribution. However, this approach necessarily employs fixed parameters and is therefore inflexible. A third approach employs a circuit for performing log-polar image transformations in conjunction with a programmable device. This approach provides more speed and flexibility. The disclosed Projective Fourier transforms are important for the first and third approach, but less important for the second. The disclosed Projective convolution also is important for the first and third approaches.

The standard Fourier Transform (FT) used to represent digital images, which is efficiently computable by the Fast Fourier Transform (FFT) algorithm, is not well adapted to both the perspective and conformal image transformations. For example one can render translated and rotated copied of an image using one Fourier image representation, but, when perspective or conformal image transformations are applied, this is no longer feasible.

Other, more recently developed image representations based upon theories of computational harmonic analysis involving wavelet, Gabor and Fourier-Mellin transforms suffer from the same problem as Fourier analysis of not being well adapted to perspective and conformal transformations. A lack of perspective and conformal characteristics follow form the fact that these transforms are based upon Euclidean, affine Heisenberg and similarity group transformations rather than a group of full-blown projective transformations. Although substantial work has been done to develop image representations well adapted to many important Lie groups and projected motion groups, e.g. [1,7,8], no attempts have been undertaken to develop systematically the corresponding image processing algorithms from the group-theoretic framework.

SUMMARY OF THE INVENTION

Appendix A, included below, details a geometric description of a proposed "conformal" camera model and details mathematical proofs of various exemplary processes employed in the claimed subject matter. Appendix B, also below, is a list of references referred to throughout this Specification by means of a number within square brackets, e.g. "[1]" and "[1, 2, 3]". Mathematical equations, introduced throughout the Specification, are thereafter referred to by the numbers, enclosed in parentheses, to each equation's right, e.g. "(1)".

The disclosed subject matter provides a data model and method for digital image representation based upon Discrete Projective Fourier Transform (DPFT) constructed in the non-compact (referred to as "DNPFT") and compact (referred to as "DCPFT") realizations of geometric Fourier analysis on SL(2,C) group. Novel characteristics of the model include the following: 1) The model is well adapted to perspective image transformations; and 2) The model is well adapted to the retinotopic (conformal) mapping of the biological visual system.

In order to compute the DPFT of a digital image by Fast Fourier transform (FFT), an image is re-sampled with a non-uniform log-polar sampling geometry, or a "retinal image," which in the log-polar coordinate plane becomes uniform, or a "cortical image." This is referred to as the "sampling interface." In the context of this re-sampling, the disclosed subject matter also accounts for Nyquist conditions needed to avoid aliasing when processing a pattern in the log-polar coordinate plane.

Further, the disclosed subject matter presents a "deconformalization" procedure that corrects the "conformal lens optics" of the conformal camera in order to render image perspective transformations produced by the conformal camera. Here, one component, a non-uniform FFT algorithm, needed for rendering efficiently these image perspective transformations involves well-developed and understood algorithms, freely available in the Internet for downloading.

DNPFT computes the convolution in the noncompact realization defined over 2-dimensional rotations in the image plane and dilations while the DCPFT computes the convolution in the compact realization (which is defines over all 3-dimensional rotations) and therefore provides basis for developing projectively invariant under all rotations object matching. Together, both convolutions provide an efficient framework for perspectively invariant object recognition.

The computational harmonic analysis and method proposed in conjunction with conformal camera image processing is suitable for providing elegant image processing tools for foveated architecture of silicon retina sensors used in some active vision systems [2, 3, 15] motivated by biological visual systems. For example, the exponential chirp transform based on a simple change of coordinates in the standard Fourier transform, that was developed in [4], does not provide the computational framework of harmonic analysis well adapted to perspective image transformations and has, therefore, not influenced the development of the image processing tools needed for foveated sensors architecture of active vision systems.

Simply stated, one implementation of the claimed subject matter, including the discrete projective convolution computable efficiently by FFT and the reconstructing algorithm from non-uniform sampling, has three components: a sampling interface expressing sampled patterns in the log-polar coordinate plane; a generator of image projective transformations in the log-polar coordinate plane (including corrections for conformal distortions); and a sampling interface rendering the perspectively transformed patterns in image, or viewing, plane.

This summary is not intended as a comprehensive description of the claimed subject matter but, rather is intended to provide a brief overview of some of the functionality. Other systems, methods, features and advantages of the invention will be or will become apparent to one with skill in the art upon examination of the following figures and detailed description.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 1A is a 3-dimensional representation of the image plane, which is described in detail in conjunction with FIG. 1B.

DETAILED DESCRIPTION OF THE FIGURES

Although described with particular reference to planar objects, i.e. patterns, the claimed subject matter can be implemented in any system in which it is desirable to have perspectively-independent recognition of a three-dimensional object, either containing a planar surface or three easily identifiable, relatively fixed points (thereby defining a plane) in a general position.

The method of the invention can be implemented in software, hardware, of a combination of hardware and software. Selected portions of the method are implemented in hardware and software. The hardware portion of the invention can be implemented using specialized hardware logic. The software portion can be stored in a memory and be executed by a suitable instruction execution system (microprocessor). The hardware implementation of the method can include any or a combination of the following technologies, which are well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Furthermore, the software of the method, which comprises an ordered listing of executable instructions for implementing logical functions, can be embodied in any computer-readable medium for use by or in connection with an instruction execution system, apparatus or device, such as a computer-based system, processor-containing system or other system that can fetch instructions from the instruction execution system, apparatus or device and execute the instructions.

In the context of this document, a "computer-readable medium" can be any means that can contain or store, the program for use by or in connection with the instruction execution system, apparatus or device. The computer-readable medium can be, for example but not limited to, an electronic, magnetic optical, electromagnetic, or semiconductor system, apparatus or device. More specific examples (a non-exhaustive list) of the computer readable medium would include the following: an electrical connection (electronic) having one or more wires, a portable computer diskette (magnetic), a random access memory (RAM), a read-only memory (ROM, an erasable programmable read-only memory (EPROM or Flash memory), (magnetic), and a portable compact disc read-only memory or another suitable medium upon which the program is printed, as the program can be electronically captured, via for instance optical scanning of the paper or other medium, then compiled, interpreted or otherwise processed in a suitable manner if necessary, and then stored in a computer system.

Figure 1A:
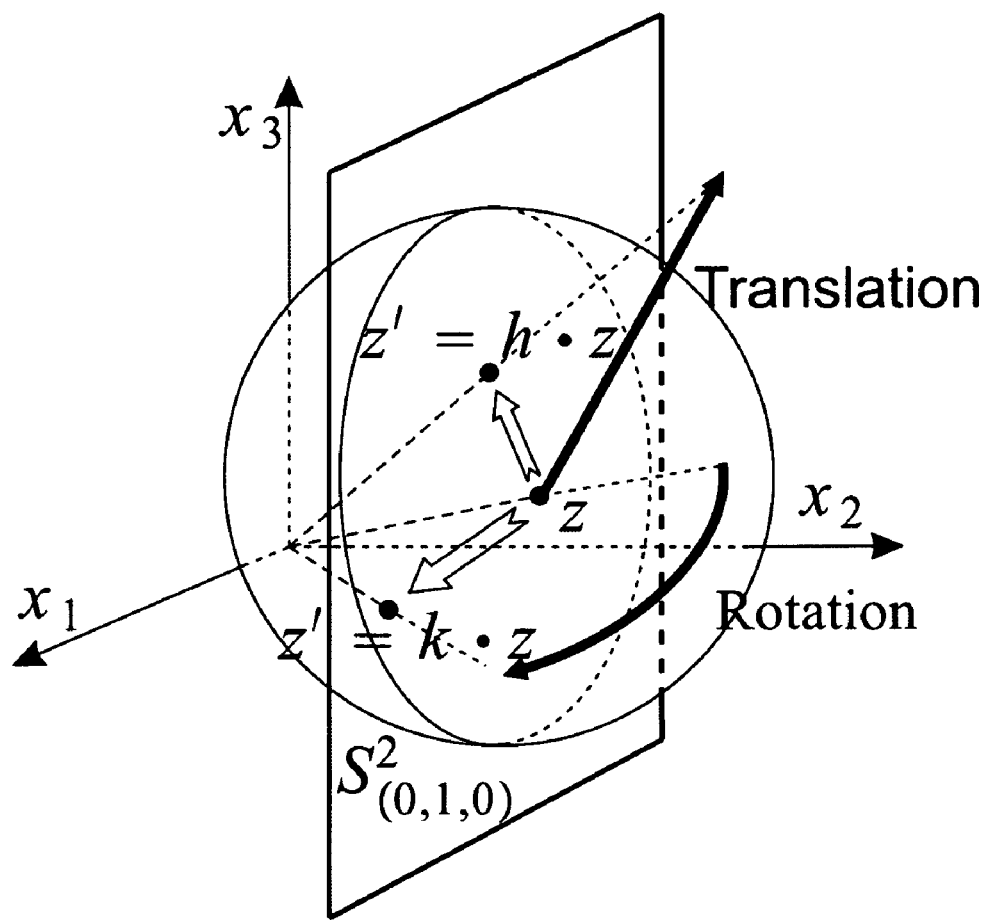
FIGS. 1A and 1B illustrates a conformal camera model upon which a process for correcting projective image transformations for conformal distortions, or "de-conformalization," in order to display image perspective transformations.

Turning now to the figures, FIG. 1A is a three-dimensional representation of an image plane 101 (see FIG. 1B) illustrated and described in more detail below in conjunction with FIG. 1B.

Figure 1B:
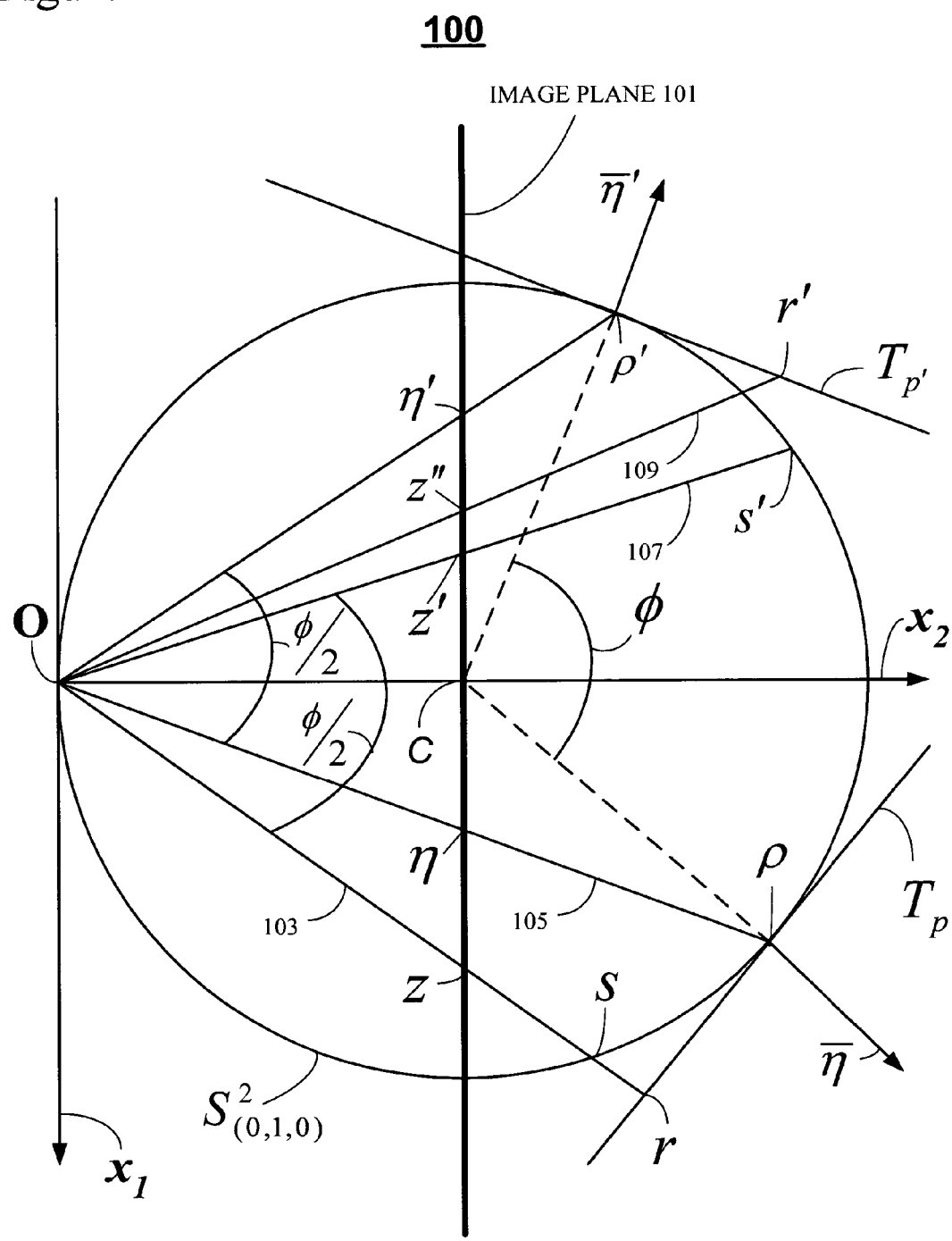

FIG. 1B illustrates the geometry 100 of a conformal camera (not shown) upon which the projective Fourier analysis is constructed. Geometry 100 provides the theoretical foundation of the claimed subject matter. The center of a planar projection is located at the origin with an image plane 101 consisting of points $(x_1, 1, x_3)$ that are identified with the complex numbers $X_3+ix_1$. image plane 101 is also referred to as the complex line C. This implies that the image points on image plane 101 are obtained by the projection $j(x_1,x_2,x_3)= (x_3+x_1)/x_2$. A group of projective transformations in the conformal camera is constructed for planar objects of patterns as follows.

A pattern lives in the image plane 101 and its projective distortions are generated by (i) translating the pattern from image plane 101 and then projecting it back to image plane 101 by the projection j; (ii) projecting the pattern by j on a unit sphere $S^2_{(0,1,0)}$ with center at (0,1,0), rotating the sphere about the center and then projecting the rotated pattern back to image plane 101; and (iii) by all finite iterations of transformations in (i) and (ii). The resulting group of image projective transformations (see [19]) is the group SL(2,C) of 2×2 complex matrices of determinant 1, acting on image points $z \in$ by linear-fractional (conformal) mappings as follows:

$$z \mapsto g \cdot z = \frac{dz+c}{bz+a}; g = \begin{pmatrix} a & b \\ c & d \end{pmatrix} \in SL(2,) \quad (1)$$

We note that if the rotation of $S^2_{(0,1,0)}$ is given in terms of Euler angles $(\psi,\phi,\psi')$, where $\psi$ and $\psi'$ are rotations about the current $x_2$-axis and $\phi$ is rotation about the axis parallel to the $x_3$-axis, the corresponding projective transformation is given by the following:

$$k = \pm \begin{pmatrix} \cos(\frac{\phi}{2})e^{-i(\psi+\psi')/2} & i\sin(\frac{\phi}{2})e^{-i(\psi-\psi')/2} \\ i\sin(\frac{\phi}{2})e^{i(\psi-\psi')/2} & \cos(\frac{\phi}{2})e^{i(\psi+\psi')/2} \end{pmatrix} \in SL(2, C) \quad (2)$$

acting on the pattern's points as in (1).

If $f:D \to R$, where $D \subset C$, is the intensity function of a pattern, the pattern's projective transformation by $g \in SL(2,C)$ is the pattern with the intensity function $f_g:gD \to R$ where $f_g(z)= f(g^{-1} \cdot z)$ with the action $g^{-1} \cdot z$ given in (1). A camera constructed according to geometry 100 above in FIG. 1 possesses conformal lens optics because (1) are conformal mappings. Therefore, it is a conformal camera. Later, the claimed subject matter is also employed to correct image projective transformations for the conformal distortions in order to render image perspective transformations.

Cameras used in machine vision research, including the most common pinhole camera, involve 3×4 real matrices describing, in the corresponding space and image plane coordinate systems (FIG. 1A), the composed effect of the projection the points of space on an image plane such as image plane 101 and the corresponding transformations between the space and the image plane coordinates. See [17] for the classifications of the cameras used in machine vision in terms of the corresponding 3×4 matrices. These cameras are used to extract geometric information from scenes, such as projective invariants [13]. However, the set of 3×4 matrices describing a particular camera does not form a group, which is a major obstacle in developing a group theoretical approach to image representation that is well adapted to image transformations produced by the camera. In other words, in current systems, a particular image can not be easily associated with a corresponding transformed image.

On the other hand, the conformal camera is characterized by the image projective-transformations given by the action of the group SL(2,C) on the points of the image plane. Further, the group SL(2,C) has a well-understood harmonic analysis on it, which is a sophisticated computational framework for efficient image processing. This framework is employed in this work to construct a data model of digital image representation well adapted to image projective transformations.

Although, the conformal camera is central to the construction of the efficient computational framework for projectively covariant image representation, it is somehow less intuitive than a pinhole camera, commonly used in computer vision.

However, if we closely examine a biological visual system such as the human visual system, we realize that the retina of the eye (the camera with almost spherical image surface), does not "see" as it contains photoreceptors in the form of rod and cone cells with chemicals that release energy when struck by light. The nerve system sends the retinal image (variation in released energy) to the primary visual cortex, an area in the visual cortex on the back of the brain. The brain processes visual information by sending it to many different, but highly interconnected cortical areas, the exact function of which is not yet understood, and "sees" the coherent picture, see [10]. We shall demonstrate in this Specification that the digital date model for image representation developed here upon the conformal camera and employed in the claimed subject matter, provides the efficient computational framework for the first step of the visual pathway: the retinotopic mapping from the retina to the primary visual cortex.

The De-Conformalization Problem

In order to render image perspective transformations, we must correct for the conformal part of the image projective transformations—the conformal "lens optics" of a camera model such as camera model 100. Conformal distortions are introduced by elements of the form (2) in SL(2,C). However, to simplify this procedure, called "de-conformailization," we discuss it for rotations of the form $(0,\phi,0)$, that is, for the image projective transformations given by the following linear-fractional mappings:

$$z' = g^{-1} \cdot z = \frac{z\cos\left(\frac{\phi}{2}\right) - i\sin\left(\frac{\phi}{2}\right)}{-iz\sin\left(\frac{\phi}{2}\right) + \cos\left(\frac{\phi}{2}\right)}. \quad (3)$$

In this case, the procedure of de-conformalization is presented below in FIG. 2, where for simplicity we show only the intersection of the conformal camera model 100 with the plane $x_3=0$. First, $z'=x'_3+ix'_1$ in (3) can be written using standard trigonometric identities, as follows:

$$z' = x'_3 + ix'_1 = \frac{2x_3 + i[((x_3)^2 + (x_1)^2)\sin\phi + 2x_3\cos\phi - \sin\phi]}{[(x_3)^2 + (x_1)^2](1-\cos\phi) + x_1\sin\phi + \frac{1}{2}(\cos\phi - 1)}$$

from which we easily obtain the real and imaginary parts of z':

$$x'_3 = \frac{2x_3}{(x_1^2 + x_3^2)(1-\cos\phi) + 2x_1\sin\phi\_\cos\phi + 1} \quad (4)$$

$$x'_1 = \frac{(x_1^2 + x_3^2)\sin\phi + 2x_1\cos\phi - \sin\phi}{(x_1^2 + x_3^2)(1-\cos\phi) + 2x_1\sin\phi\_\cos\phi + 1}$$

To correct for the conformal distortions, we choose a "midpoint" $\eta=b+ia$ of the pattern and extend the projection of the pattern from the sphere $S^2_{(0,1,0)}$ to a plane $T_p$ tangent to sphere $S^2_{(0,1,0)}$ at a point $p=\sigma^{-1}(\eta)=(a^2+b^2+1)^{-1}(2a,2,2b)$. Then, after rotating sphere $S^2_{(0,1,0)}$, with attached tangent plane $T_p$, about the $x'_3$-axis by the angle $(0,-\phi,0)$, and projecting it back from the rotated tangent plane, we obtain the projective transformations corrected for conformal distortions; that is, the perspective transformations. The corresponding coordinates $z''=x''_3+ix''_1$ of the projective transformation corrected for conformal distortions, with $\eta=b+ia$, are given by the following:

$$x''_{3m,n} = \frac{2x_3}{(2ax_1 - a^2 + 2bx_3 - b^2)(1-\cos\phi) + 2x_1\sin\varphi + \cos\phi + 1} \quad (5)$$

$$x''_1 = \frac{(2ax_1 - a^2 + 2bx_3 - b^2)\sin\phi + 2x_1\cos\phi - \sin\phi}{(2ax_1 - a^2 + 2bx_3 - b^2)(1-\cos\phi) + 2x_1\sin\varphi + \cos\phi + 1}$$

The extension of (5) to general image projective transformations is not difficult.

Noncompact Projective Fourier Transform, Its Inverse and the Convolution

For a given intensity function f(z), the projective Fourier transform and its inverse have been constructed in [18] in terms of noncompanion of the irreducible unitary representations of SL(2,C). They are as follows:

$$\hat{f}(k,s) = \frac{i}{2}\int f(z)\left(\frac{z}{|z|}\right)^{-k}|z|^{-is-1}dzd\bar{z} \quad (6)$$

where if $z=x+iy$, then $(i/2)dzd\bar{z}=dxdy$ and $$f(z) = 2\pi^{-2}\sum_{k=-\infty}^{\infty}\int_{-\infty}^{\infty}|z|^{is-1}\left(\frac{z}{|z|}\right)^k \hat{f}(k,s)ds. \quad (7)$$

The convolution in a noncompact picture is defined on the subgroup $$\left\{\begin{pmatrix} a^{-1} & 0 \\ 0 & a \end{pmatrix}\right\} \subset SL(2,C), \quad (8)$$

$$f_1 * f_2(z) = \frac{i}{2}\int f_1(g^{-1}\cdot z)f_2(\xi)\frac{d\xi d\bar{\xi}}{|\xi|^2}$$

where $$g = \begin{pmatrix} \delta^{-1/2}e^{-i\rho/2} & 0 \\ 0 & \delta^{1/2}e^{-i\rho/2} \end{pmatrix} \text{ and } \xi = \delta e^{i\rho}.$$

Taking the projective Fourier transform of the convolution (8) and changing the variable by $\eta=\xi^{-1}z$, we easily obtain the convolution property:

$$f_1 * f_2(k,s) = f_1(k,s)f_2(k,s). \quad (9)$$

Discrete Noncompact Projective Fourier Transform

In log-polar coordinates $(u,\theta)$ given by $z=e^u e^{i\theta}$, (6) has the standard Fourier integral form $$\hat{f}(s,k) = \int_0^{2\pi/L}\int_{\ln r_a}^{\ln r_b} g(u,\theta)e^{-i(us+\theta k)}dud\theta \quad (10)$$

where the support of $g(u,\theta)=e^u f(e^{u+i\theta})$ is assumed to be contained within $[\ln r_a, \ln r_b]\times[0,2\pi/L]$ with $L\in N$. Extending $g(u,\theta)$ periodically $$g(u+mT, \theta+2\pi n/L) = g(u, \theta), \text{ where } T = \ln\frac{r_b}{r_a},$$

it can be expanded in a double Fourier series (see [19]):

$$g(u, \theta) = \frac{L}{2\pi T} \sum_{m=-\infty}^{\infty} \sum_{n=-\infty}^{\infty} \hat{f}(2\pi m/T, nL)e^{i(2\pi mu/T + nL\theta)}, \quad (10)$$

Further, assuming $$\sup \tilde{g} = \sup f \subset [-\Omega, \Omega] \times [-\Gamma, \Gamma] \quad (11)$$

where $\tilde{g}$ is the Fourier transform of g and approximating the integral in (10) by a double Riemann sum with M×N partition points $(u_k, \theta_l) = (\ln r_a + kT/M, 2\pi d/LN)$; $0 \leq k \leq M-1, 0 \leq l \leq N-1$, we obtain $$\hat{f}(2\pi m/T, nL) \approx \frac{2\pi T}{LMN} \sum_{k=0}^{M-1} \sum_{l=0}^{N-1} g(u_k, \theta_l)e^{-2\pi i(mk/M + nl/N)}$$

where $|m| \leq \Omega k/2\pi$ and $|n| \leq \Gamma/L$. Following the discussion of the numerical aspects of the approximation in (9), we obtain the following expressions:

$$\hat{f}m, n = \sum_{k=0}^{M-1} \sum_{l=0}^{N-1} f_{k,l} e^{u_k} e^{-i2\pi nl/N} e^{-i2\pi mk/M} \text{ and} \quad (12)$$

$$f_{k,l} = \frac{1}{MN} \sum_{m=0}^{M-1} \sum_{n=0}^{N-1} \hat{f}_{m,n} e^{-u_k} e^{i2\pi nl/N} e^{i2\pi mk/M} \quad (13)$$

where $f_{k,l} = (2\pi T/LMN)g(u_k, \theta_l)e^{-u_k}$ and $\hat{f}_{m,n} = \hat{f}(2\pi m/T, nL)$. Both expressions (12) and (13) can be computed efficiently by FFT algorithms.

Finally, on introducing $Z_{k,l} = e^{u_k + i\theta_l}$ into (12) and (13), we arrive at the (M, N)-point discrete projective Fourier transform (DPFT) and its inverse:

$$\hat{f}_{m,n} = \sum_{k=0}^{M-1} \sum_{l=0}^{N-1} f_{k,l} \left(\frac{z_{k,l}}{|z_{k,l}|}\right)^{-nL} |z_{k,l}|^{-i2\pi m/T + 1} \text{ and} \quad (14)$$

$$f_{k,l} = \frac{1}{MN} \sum_{m=0}^{M-1} \sum_{n=0}^{N-1} \hat{f}_{m,n} \left(\frac{z_{k,l}}{|z_{k,l}|}\right)^{nL} |z_{k,l}|^{i2\pi m/T - 1}, \quad (15)$$

now with $f_{k,l} = (2\pi T/LMN)f(z_{k,l})$. Its projectively adapted characteristics are expressed as follows:

$$f'_{k,l} = \frac{1}{MN} \sum_{m=0}^{M-1} \sum_{n=0}^{N-1} \hat{f}_{m,n} \left(\frac{z'_{k,l}}{|z'_{k,l}|}\right)^{nL} |z'_{k,l}|^{i2\pi m/T - 1} \quad (16)$$

where $z'_{k,l} = g^{-1} \cdot z_{k,l}$, $g \in SL(2,C)$ and $f'_{k,l} = (2\pi T/LMN)f(z'_{k,l})$. We note that in (16) only the DPFT of the original pattern is involved.

Discrete Noncompact Projective Convolution

In order to define the discrete projective convolution, it is assumed that the involved patterns have the same domain. Replacing the double integral (8) by a double Riemann sum in the same way as it has been done before, we obtain the following:

$$f_1 * f_2(e^{u_m + i\theta_n}) = \sum_{k=0}^{M-1} \sum_{l=0}^{N-1} \frac{2\pi T}{LMN} f_1(e^{(u_m - u_k) + i(\theta_n - \theta_l)}) f_2(e^{u_k + i\theta_l}) \quad (17)$$

and then using $f_{m,n} = (2\pi T/LMN)f(e^{u_m + i\theta_l})$, we arrive at the following:

$$(f_1 * f_2)_{m,n} = \sum_{k=0}^{M-1} \sum_{l=0}^{N-1} f_{1[m-k, n-l]} f_{2k,l} \text{ where} \quad (18)$$

$$f_{1[m-k, n-l]} = \begin{cases} f_{m-k, n-l} & \text{if } m \geq k \text{ and } n \geq l \\ f_{n-1+N} & \text{if } n < l \\ f_{m-k+M} & \text{if } m < k \end{cases}.$$

Now, the convolution property for the DPFT have the form $$(f_1 * f_2)_{m,n} = \hat{f}_{1m,n} \hat{f}_{2m,n}. \quad (19)$$

This property allows fast computation of the discrete projective convolutions of digital images.

Retinotopic Mapping

It has been evidenced through experiments in neuroscience that retinotopic mapping from the visual field to the primary visual cortex is characterized by a complex logarithmic transformation (see E. L. Schwartz, *Spatial Mapping in Primate Sensory Projection: Analytical Structure and Relevance to Perception*, Biological Cybernetics, 25, 1977, pp. 181-194). The principle complex logarithm ln $z = \ln re^{i\theta} = \ln r + i\theta$ has been identified in image plane 101 of the conformal camera with log-polar coordinates $(u, \theta)$ where $u = \ln r$. These coordinates have been used to express PFT (6) and DPFT (14) of a pattern as the standard Fourier transforms of the corresponding log-polar pattern (10) and (12), respectively. Hence, the discrete projective Fourier transform of the log-polar pattern is computable by FFT.

The retinotopic mapping $z \to \ln z$ gives correct magnification (discussed below) in the foveal region and it carries the similarity $z \to \rho z$ and rotation $z \to e^{i\phi}z$ transformations in the visual field to the corresponding translations in the cortical space. In fact, if $z = re^{i\theta}$ then for the similarity transformation: ln $r \to \ln r + \ln \rho$ and for the rotational transformation: $\theta \to \theta + \phi$. Both the magnification and geometric transformations result in savings on the information processed by the brain. As mentioned above, the human's brain size would have to exceed 5,000 lb. to process all the pictorial information.

Figure 2:
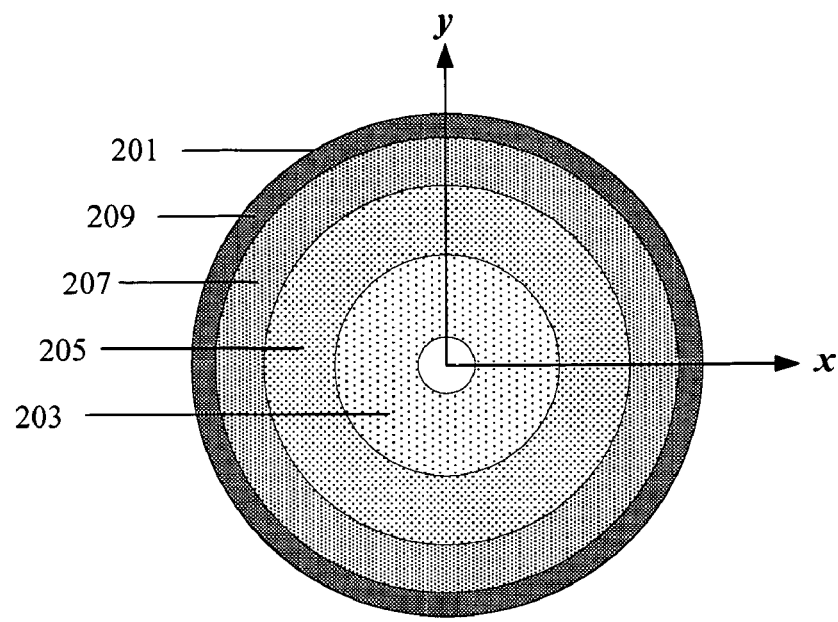
FIG. 2 illustrates an exemplary image in a retinotopic system, a system employed by many biological vision systems, including the human vision system.
Figure 3:
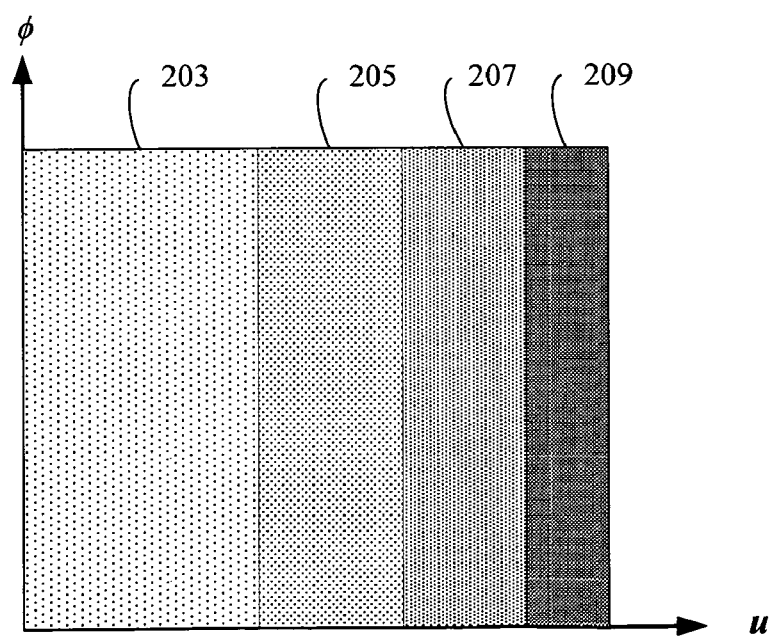
FIG. 3 illustrates the image of FIG. 2 mapped onto a rectangular coordinate system.

FIGS. 2 and 3 illustrate the concept of retinotopic mapping, in our model, the mapping between a "retinal" field 200 and a "cortical", or log-polar, field 250. Regions 203, 205, 207 and 209 of FIG. 2 correspond to regions 203, 205, 207 and 209 of FIG. 3, mapped into different systems 200 and 250. We note that the most of a cortical space 201 in FIG. 2 corresponds to "foveal" region 203 of FIG. 3 and significantly less corresponds to peripheral regions 205, 207 and 209. This illustrates the concept of "magnification" in the biological visual system with the fine resolution only in the foveal region, decreasing dramatically with the distance from the fovea.

DNPFT in Digital Image Processing

DPFT is implemented in MATLAB's Image processing Toolbox, published by Mathworks, Inc. of Natick, Mass. However, DPFT has the standard Fourier integral form in log-polar coordinates. Therefore, to convert analog images to the digital form and compute their DPFT by FFT, the claimed subject matter re-samples an image such that the sampling geometry in the log-polar coordinate plane consists of equal rectangular pixels. This procedure is referred to as the sampling interface.

The Sampling Interface

Figure 4:
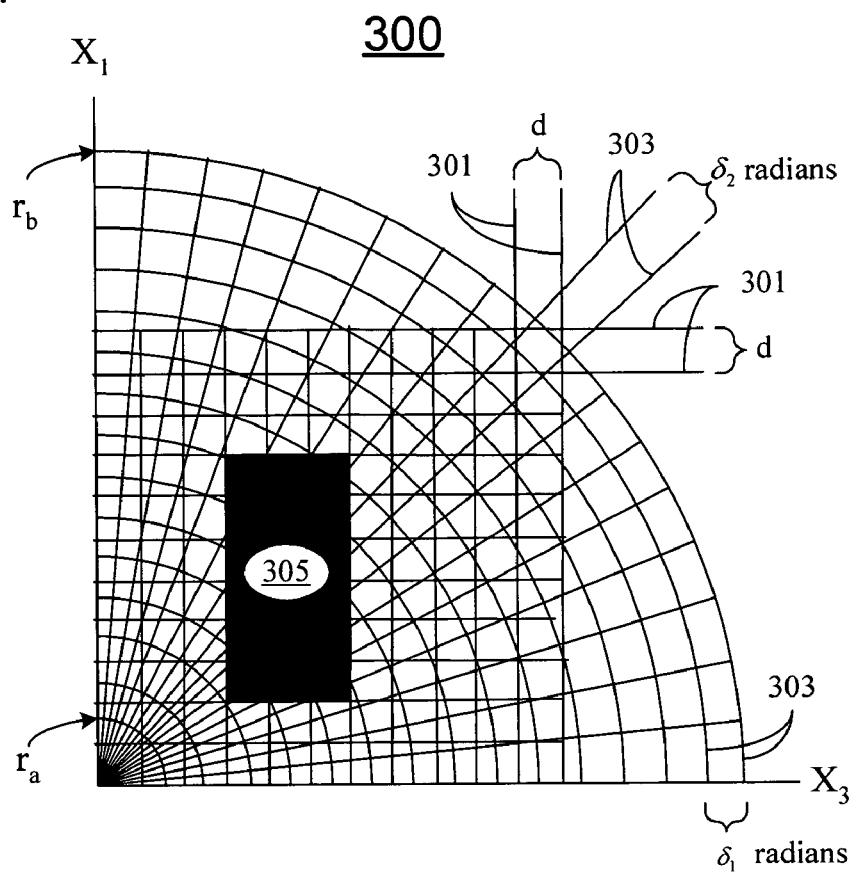
FIG. 4 illustrates a bar pattern on a white background covered by a grid consisting of squares, each d×d square representing a pixel, describing a uniformly sampled image.

A graph 300 in FIG. 4 shows the first quadrant of the $X_1$ and the $X_3$ axis of image plane 101 (FIGS. 1 and 2). In FIG. 4, a bar pattern 305 is displayed on [a,b]×[a,b] white area where A=b−a. The original regular sampling of the pattern by square pixels d×d is represented by a grid 301, in which, for the sake of simplicity, only two vertical and two horizontal lines are marked. A log-polar grid 303 of concentric lines with straight lines through the origin represents a non-uniform re-sampling of the pattern in terms of pixels as sectors of fixed angular size $\delta_2$ radians and the radial size decreasing logarithmically from the most distant ring of thickness $\delta_1$.

With a pattern domain contained within the set $[r_a, r_b] \times [0, 2\pi/L]$, pixels of the log-polar sampling are obtained by taking the radial and angular partitions, $$r_k = r_a e^{k\delta_1}, k=0,1,\ldots,M; \alpha_l = l\delta_2; l=0,1,\ldots,N, \quad (20)$$

respectively. An exemplary two-dimensional (2D) object 305 is shown superimposed on both rectangular grid 301 and the log polar grid 303.

The minimal rate of log-polar sampling 303 depends on the desired resolution of image 305. In this example, the upper right pixel is covered by one sector of the log-polar partition whose area is approximately the area of the pixel. Otherwise, if one needs to increase or decrease the image resolution, the number of sectors per this pixel can be a user-supplied parameter. Log-polar sampling geometry 303 becomes again uniform with rectangular pixels $\delta_1 \times \delta_2$, shown for clarity only in the left corner of FIG. 5. To determine $\delta_1$ and $\delta_2$ or equivalently the resolution M×N, we assume that the pattern size in the image plane is A×A and the pixels size is d×d. Then, a simple geometrical consideration using the radial partition in (11) gives the following relations between dimensions of pixels:

$$\delta_1 = -\ln(1 - d/r_b) = (d/r_b) - (d/r_b)^2 + \ldots \text{ and } \delta_2 = d/r_b$$

radians, where $r_b = r_a + \sqrt{2}A$. Because in practice $d \ll r_b$, we can take $\delta_1 = \delta_2 = \delta$ where $\delta = d/r_b$. Now, using (11), the resolution M×N of the image in log-polar coordinates is given by $$M = (r_b/d)\ln(r_b/r_a)$$

and $$N = \pi r_b/(2d).$$

If for example bar pattern 205, we take L=4, A=16, $r_a$=0.5 and d=1 (in units of pixels) and we obtain: $\delta$=0.04, M=89 and N=35.

Figure 5:
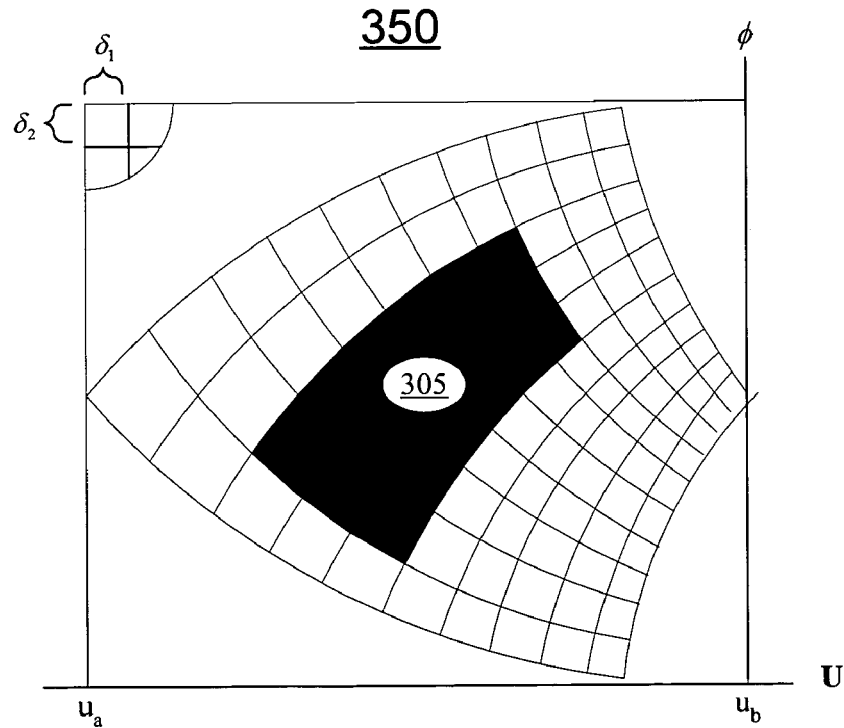
FIG. 5 illustrates the bar pattern of FIG. 4 sampled with the non-uniform log-polar geometry and rendered in a log-polar coordinate plane.

In FIG. 5, bar pattern 305 is rendered in a log-polar coordinate plane 350, using the sampling interface algorithm described above, with a resolution chosen to smoothen pixel boundaries.

Band-Limited Images

If one assumes that a given pattern such as pattern 305 has a bounded spectrum, such as $[-\omega,\omega] \times [-\omega,\omega]$, then a value can be determined, for example, by the rate at which the (standard) Fourier transform of the pattern is decaying for large spatial frequencies. The Nyquist condition requires that the sampling distance d satisfies the relation $d = \pi/\omega$ in both the x- and y-axis directions. Recalling that in the log-polar plane $\delta = T/M = 2\pi/LN$, we have $M = \omega r_b T/\pi$ and $N = \omega r_b/L$, where $T = \ln((r_b/r_a))$. We can obtain the log-polar radial and angular frequencies and (cf., (5)) corresponding to the spatial frequency by assuming the Nyquist condition: $\delta = \pi/\Omega = \pi/\Gamma$. We conclude that $\Omega = \Gamma = (r_a + \sqrt{2}A)\omega$.

Image Projective Transformations in DNPFT

For the sake of simplicity, we consider the subgroup of image projective transformations of the following form:

$$z'_{m,n} = g^{-1} \cdot z_{m,n} = \frac{z_{m,n}\cos\frac{\phi}{2} - i\sin\frac{\phi}{2}}{-iz_{m,n}\sin\frac{\phi}{2} + \cos\frac{\phi}{2}}, \quad (21)$$

see [20]. Under the transformations (12), the equally spaced points $(u_m, \theta_n)$ transform into nonuniformly spaced points $(u'_{m,n}, \theta'_{m,n})$ with the coordinates satisfying the equations:

$$e^{2u'_{m,n}} = \frac{e^{2u_m}\cos^2\frac{\phi}{2} + \sin^2\frac{\phi}{2} - e^{u_m}\sin\phi\sin\theta_n}{e^{2u_m}\sin^2\frac{\phi}{2} + \cos^2\frac{\phi}{2} - e^{u_m}\sin\phi\sin\theta_n} \text{ and} \quad (22)$$

$$\tan\theta'_{m,n} = \frac{1/2(e^{2u_m} - 1)\sin\phi + e^{u_m}\sin\theta_n\cos\phi}{e^{u_m}\cos\theta_n}, \quad (23)$$

In terms of $(u'_{m,n}, \theta'_{m,n})$, (10) is now expressed by $$f'_{m,n} = \frac{1}{MN}\sum_{k=0}^{M-1}\sum_{l=0}^{N-1} \hat{f}_{k,l} e^{-u'_{m,n}} e^{i2\pi u'_{m,n}/T} e^{i\theta'_{m,n}lL} \quad (24)$$

where $f'_{m,n}$ denotes the value $f_{m,n}$ given in (10) but taken at $(u'_{m,n}, \theta'_{m,n})$ such that $$z'_{m,n} = e^{u'_{m,n}} e^{i\theta'_{m,n}}.$$

Finally, expressing (4) and (5) in terms of discrete values $Z_{m,n} = x_{3m,n} + ix_{1m,n}$, $z'_{m,n} = x'_{3m,n} + ix'_{1m,n}$, and $Z''_{m,n} = x''_{3m,n} + ix''_{1m,n}$, the coordinates (5), corrected for conformal distortions of the projectively transformed pixels, can also be used in a straightforward way to correct for conformal distortions in log-polar coordinates for the projectively transformed pixels $(u'_{m,n}, \theta'_{m,n})$ given in (22) and (23). These corrected log-polar coordinates are denoted by $(u''_{m,n}, \theta''_{m,n})$, in terms of which the conformal-distortion free inverse DPFT is given as follows:

$$f''_{m,n} = \frac{1}{MN}\sum_{k=0}^{M-1}\sum_{l=0}^{N-1} \hat{f}_{k,l} e^{-u''_{m,n}} e^{i2\pi u''_{m,n}k/T} e^{i\theta''_{m,n}lL}. \quad (25)$$

Recent advances in nonuniform FFT (e.g., [5, 14]) allow the development of efficient algorithms reconstruction both $f'_{m,n}$ and $f''_{m,n}$ from known $\hat{f}_{k,l}$ by comparing (22) and (25), respectively.

DNPFT in Foveated Image Processing

Recall that retinotopic mapping from the visual field to the primary visual cortex is characterized by a logarithmic transformation which in a natural way is identified with log-polar coordinates used to express DPFT of the pattern as the discrete Fourier transform in order to compute it by FFT.

The re-sampling procedure, introduced before and referred to as the sampling interface, provides an example of foveated or space-variant image representation used for the architecture of a silicon retina sensor in certain cameras of the active vision systems [2, 13, 15].

Some advantages (data processing reduction, similarity invariance) of the log-polar sampling motivated the development of foveated sensor architectures (silicon retina) in machine vision systems consisting of a moving stereo camera head coupled with a hardware image processor and linked to the computer performing the image analysis. However, due to the lack of image processing tools that are explicitly designed for foveated vision, space-variant sensors have not been widely used in the active vision systems [22]. The disclosed subject matter provides those image processing tools.

Computer Simulations for Binary Images

Figure 6:
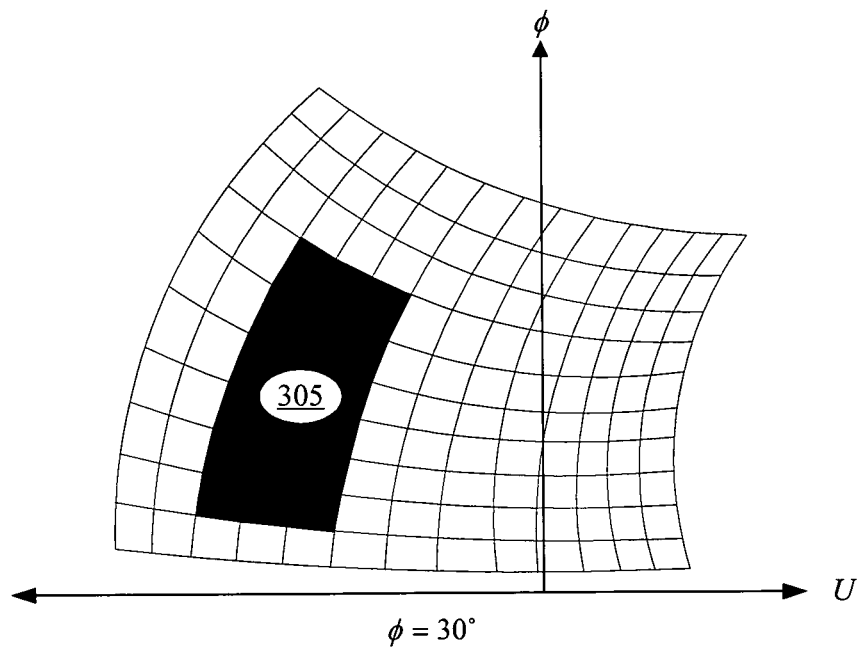
FIG. 6 illustrates an image projective transformations for one value of $\phi$, corrected for conformal distortions, or "deconformalized," of the bar pattern of FIGS. 4 and 5.
Figure 7:
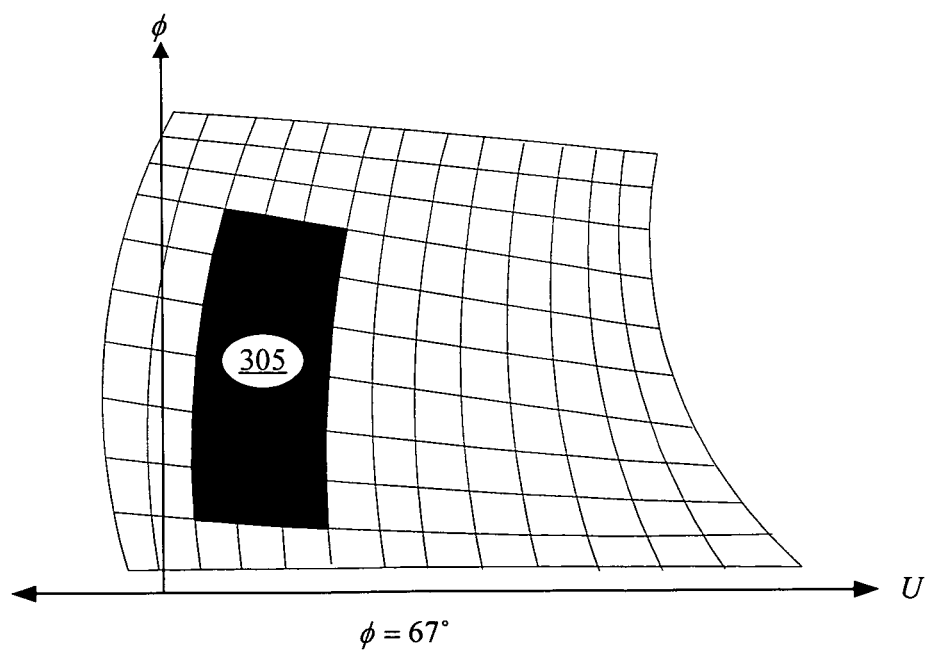
FIG. 7 illustrates an image projective transformations for a second value of $\phi$, corrected for conformal distortions, or "de-conformalized," of the bar pattern of FIGS. 4 and 5.

In FIGS. 6 and 7 deconformalized image projective transformations of bar pattern 205 (FIGS. 4 and 5) are displayed in a log-polar coordinate plane for two different values of $\phi$, specifically $\phi$=30 degrees (30°) in a grid 400 of FIG. 6 and $\phi$=67 degrees (67°) in a grid 450 of FIG. 7.

Figure 8:
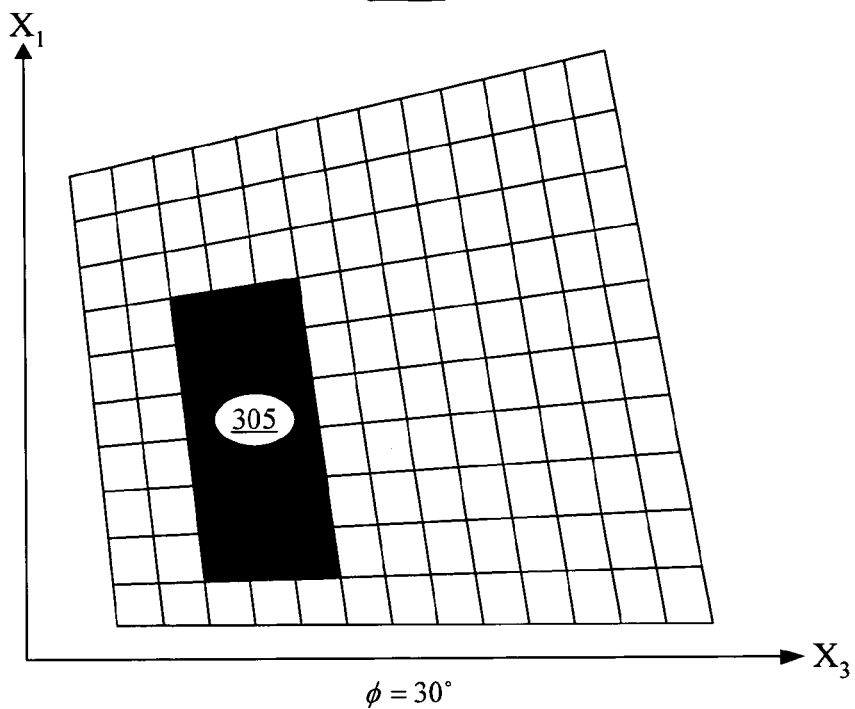
FIG. 8 illustrates a second image perspective (deconformalized projective) transformation of the bar pattern of FIGS. 5 and 6 in an image plane.
Figure 9:
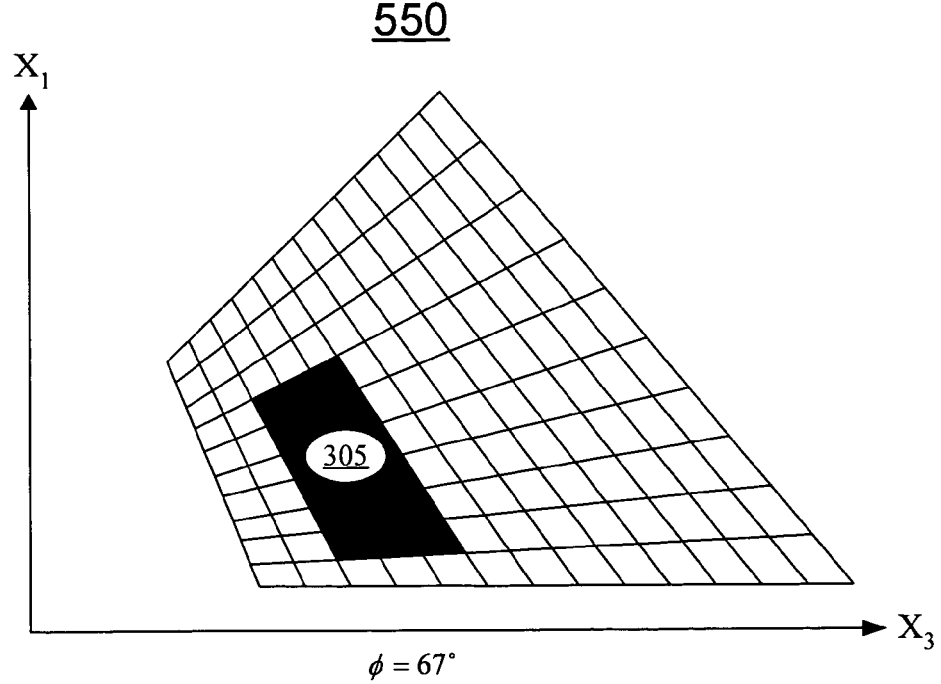
FIG. 9 illustrates an image perspective (deconformalized projective) transformation of the bar pattern of FIGS. 5 and 6 in an image plane corresponding to the image perspective of FIG. 8.

FIGS. 8 and 9 illustrate a grid 500 and a grid 550 which represent the claimed subject matter as applied to the deconformalized projective transformations in the log-polar coordinate pane in grids 400 and 450 (FIGS. 6 and 7), respectively. Grids 500 and 550 represent prospective transformations in image plane 101 (FIG. 1). In other words, FIGS. 8 and 9 show the corresponding image perspective (deconformalized projective) transformations of bar pattern 305 in image plane 101.

Figure 10:
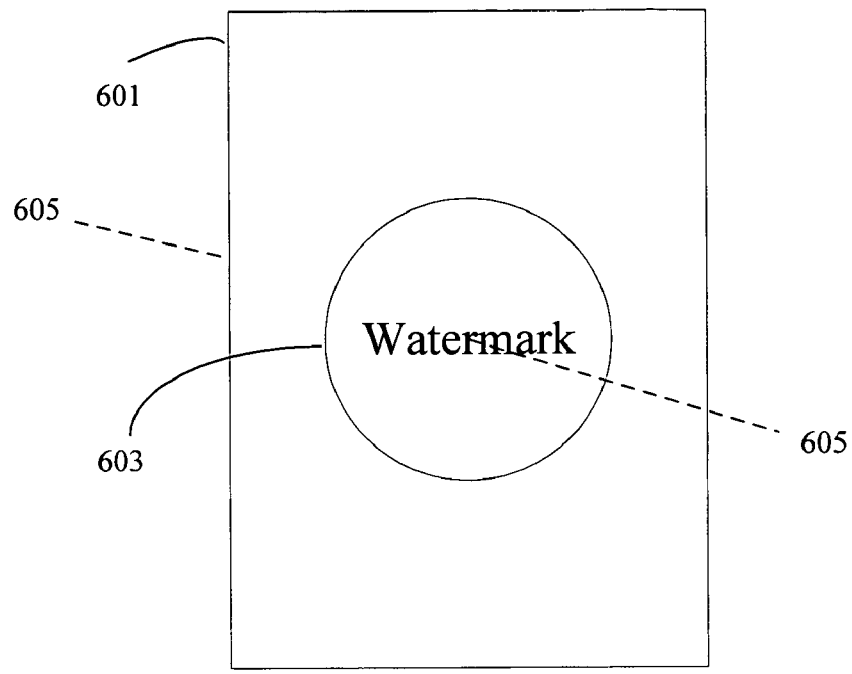
FIG. 10 illustrates a two-dimensional object which may be subject to one application of the claimed subject matter.
Figure 11:
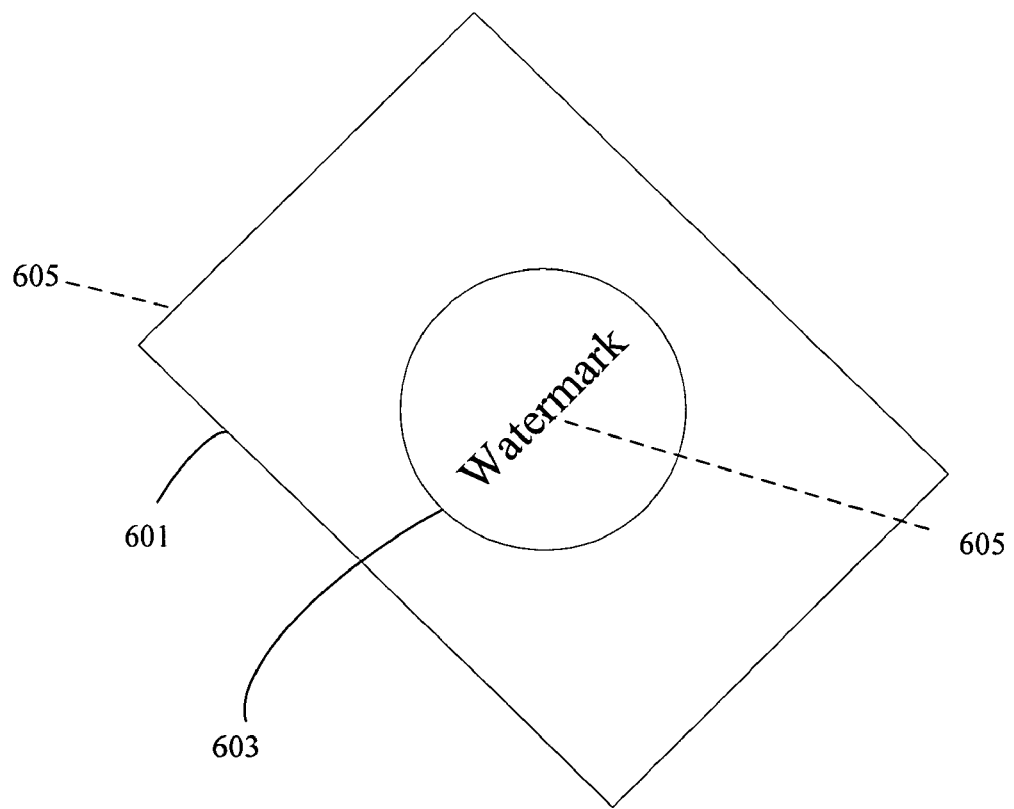
FIG. 11 illustrates the two-dimensional object of FIG. 10 rotated about a central axis.

FIGS. 10 and 11 illustrate one application of the claimed subject matter, specifically computer recognition of a two-dimensional object such as a document 601. For the sake of an example, document 601 includes a watermark 603. Watermark 603 is one example of a distinguishing feature that might be on a document such as document 601. Of course, practically any object may be viewed in two dimensions and could include a number of distinguishing features. Also illustrated is an axis 605 which passes through document 601.

In FIG. 11, document 601 is rotated about axis 605. The claimed subject matter enables a computing device (not shown) to determine that document 601 in FIG. 10 is the same object as document 601 in FIG. 11 even though document 601 has been rotated about axis 605. Further, document 601 can be identified with the claimed subject matter even if the size of the document is modified from figure to figure.

Figure 12:
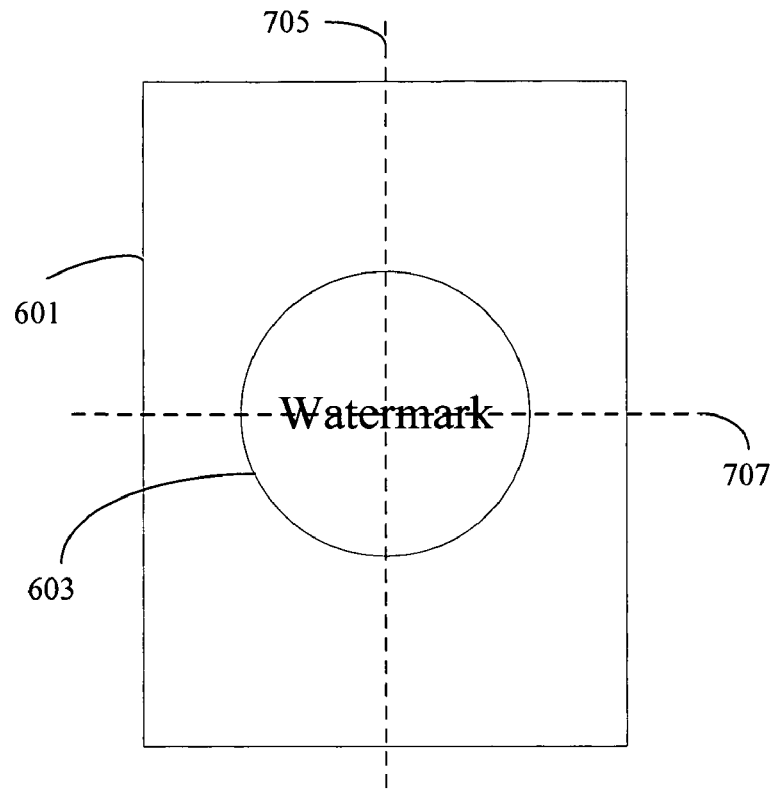
FIG. 12 illustrates another two-dimensional object that may be subjected to an application of the claimed subject matter.
Figure 13:
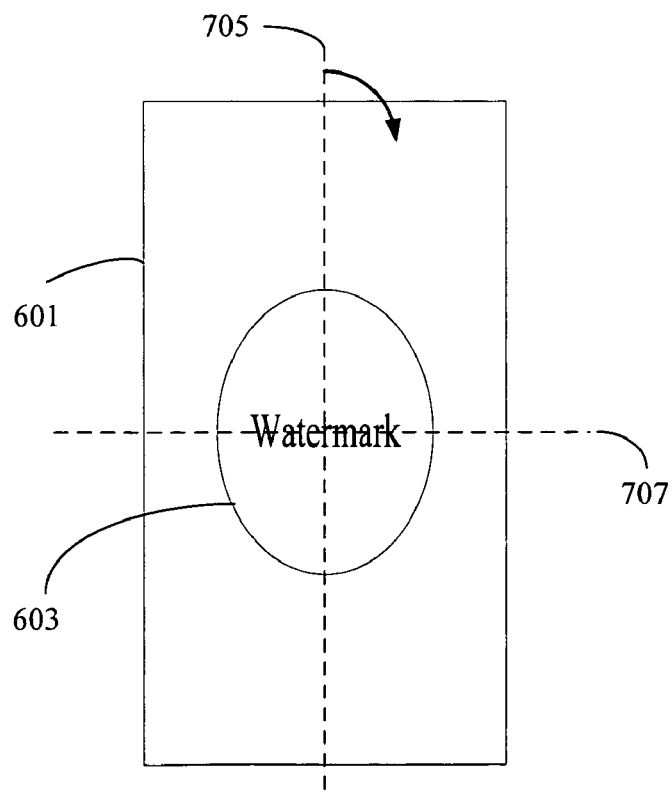
FIG. 13 illustrates the two-dimensional object of FIG. 12 rotated about a horizontal and/or vertical axis.

FIGS. 12 and 13 illustrate another application of the claimed subject matter, specifically computer recognition of a two-dimensional object, in this example document 601 (FIGS. 10 and 11), which has been rotated about a horizontal axis 707 and/or a vertical axis 705. FIG. 13 represents document 601 rotated about vertical axis 705 such that the computing device "sees" a non-head-on view of document 601. As explained in conjunction with FIGS. 10 and 11, the claimed subject matter enables the computing device to determine that document 601 in FIG. 12 is the same object as document 601 in FIG. 13 even though document 601 has been rotated about axis 705. The claimed subject matter also works if document 601 was rotated about axis 707 instead of or in addition to axis 705.

Figure 14:
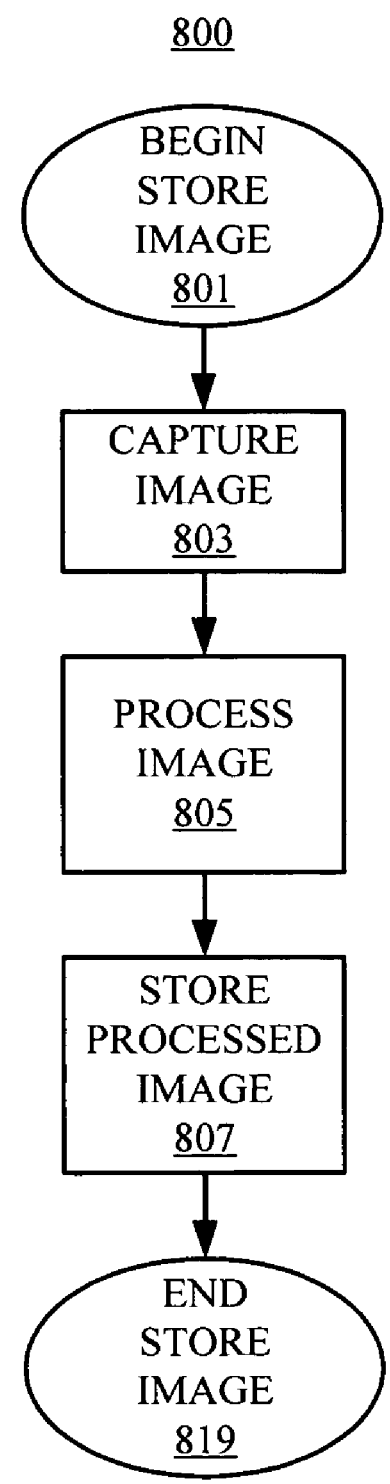
FIG. 14 is a flowchart that illustrates an exemplary Store Image process that utilizes the claimed subject matter.

FIG. 14 is a flowchart that illustrates one implementation of the claimed subject matter.

Projective Fourier Transform in Compact Realization

Compact realization of projective Fourier analysis is given by the decomposition of the pattern's intensity function f(z), referred to as the inverse compact projective Fourier transform, as follows:

$$f(z) = \sum_{l \in N} \sum_{|m| \leq l} \hat{f}(l, m) Z_l^m(z)$$

where the coefficients f(l,m) of the decomposition are given by the compact projective Fourier transform (CPFT)

$$\hat{f}(l, m) = \int_C f(z) \overline{Z}_l^m(z) 2i(1 + |z|^2)^{-2} dz d\bar{z}.$$

In the above, the projective harmonics $Z_1^m(z) = Y_1^m \circ \sigma(z)$ are given in terms of the spherical harmonics $Y_1^m, -1 \leq m \leq 1$ for each integer $l \geq 0$ $$Y_l^m \circ \sigma(re^{i\varphi}) = (-1)^m \sqrt{\frac{(2l+1)(l-m)!}{4\pi(l+m)!}} \, P_l^m\left(\frac{1-r^2}{1+r^2}\right) e^{im\varphi}, z = re^{i\varphi}$$

and the inverse of stereographic projection $\sigma(z) = (j_{;S^2(0,1,0)})^{-1}$.

The convolution operator in this realization is defined by $$C_{f_1} f_2(z) = \int_{SU(2)} f_1(g \cdot 0) f_2(g^{-1} \cdot z) \, dg = f_1 * f_2(z)$$

where $$SU(2) = \left\{ \left\{ \begin{pmatrix} \alpha & \beta \\ -\bar{\beta} & \bar{\alpha} \end{pmatrix} \right\} \middle| |\alpha|^2 + |\beta|^2 = 1 \right\}$$

is a subgroup of SL(2,C).

Then, the convolution property $$\widehat{f_1 * f_2}(l, m) = 2\pi \left(\frac{4\pi}{2l+1}\right)^{1/2} \hat{f}_1(l, m) \hat{f}_2(l, m)$$

***add hat over first term*** is satisfied.

We note that the CPFT integral can be discretized following a similar procedure we use before to descretize the NPFT for digital patterns.

FIG. 14 is a flowchart that illustrates an exemplary Store Image process 800 that employs the claimed subject matter. Processing starts in a "Begin Store Image" block 801 and proceeds immediately to "Capture Image" block 803 during which an appropriate camera (not shown) captures a digital image. A digital image is typically stored as a series of pixels that include a (x,y) coordinate and a grey scale value. Process 800 proceeds to a "Process Image" block 805 during which the image captured in block 803 is processed. Processing includes a conversion of the image by means of a non-uniform sampling into log-polar form. The converted image is then subjected to a Projective Fourier transformation. Processing proceeds to a "Store Processed Image" block 807 during which the converted image produced in block 805 is stored in a memory. Multiple images are typically stored for future reference (see FIG. 15).

Figure 15:
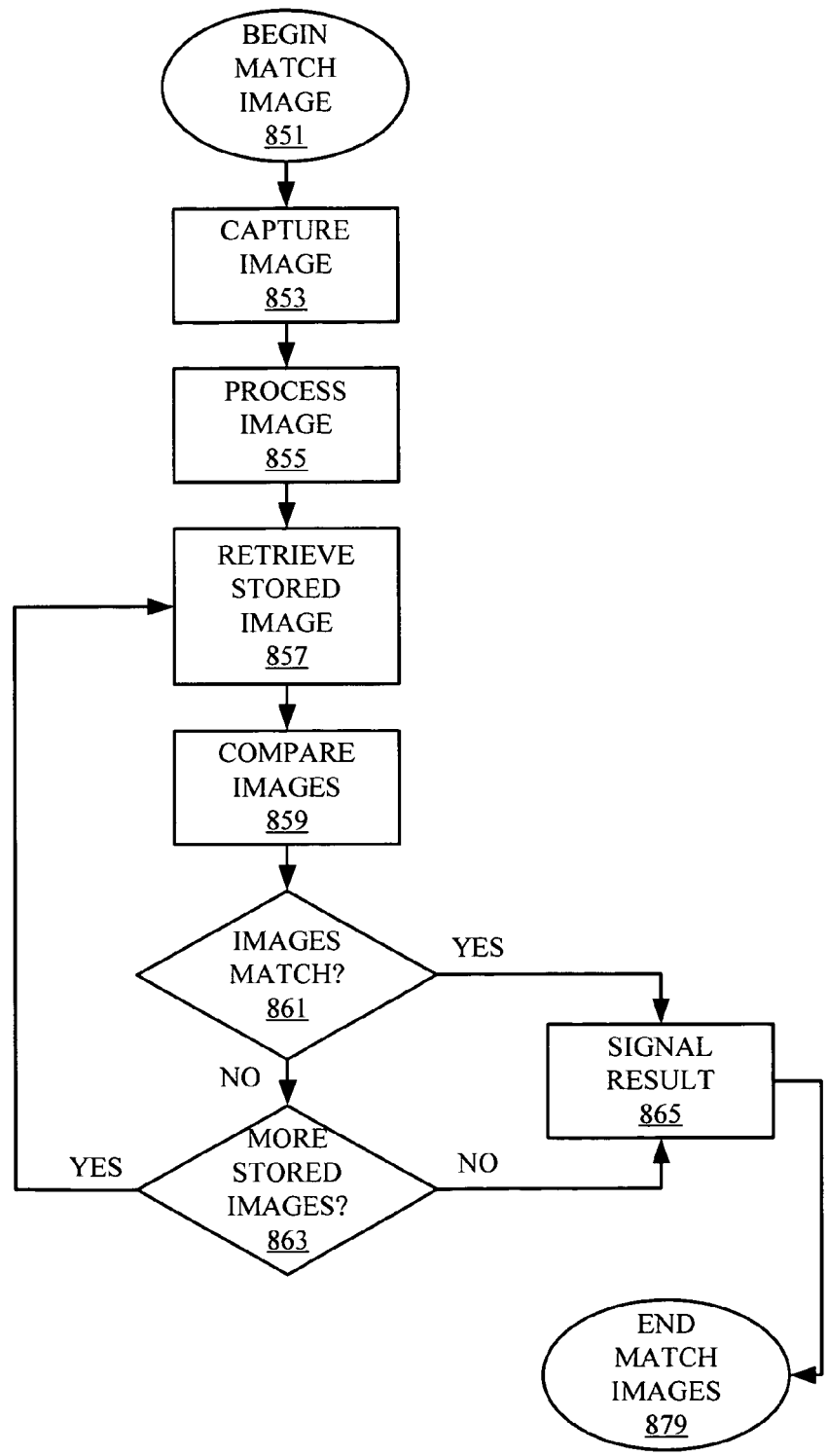
FIG. 15 is a flowchart that illustrates an exemplary Match Images process that utilizes the claimed subject matter.

FIG. 15 is a flowchart that illustrates an exemplary Match Images process 850 that employs the claimed subject matter. Processing starts in a "Begin Match Images" block 851 and proceeds immediately to a "Capture Image" block 853 during which an image to be matched is captured by an appropriate digital camera. Of course, the claimed subject matter is equally applicable for matching images off-line, i.e. images previously captured and stored for later processing.

Processing proceeds to a "Process Image" block 855 during which the image captured in block 853 (or a stored image) is processed in preparation of matching. As explained above, a digital image is typically stored as a series of pixels that include a (x,y) coordinate and a grey scale value. Like in process 800 (FIG. 14) processing includes a conversion of the image by means of a non-uniform sampling into log-polar form. The converted image is then subjected to a Projective Fourier transformation.

In a "Retrieve Stored Image" block 857, process 850 retrieves an image stored in accordance with process 800. In a "Compare Images" block 859, process 850 manipulates the image retrieved in block 857 with the processed image generated in block 855. One method of executing this comparison is to apply FFT to both images and then taking a convolution with respect to both. A resultant graph is illustrated below in FIG. 16.

Figure 16:
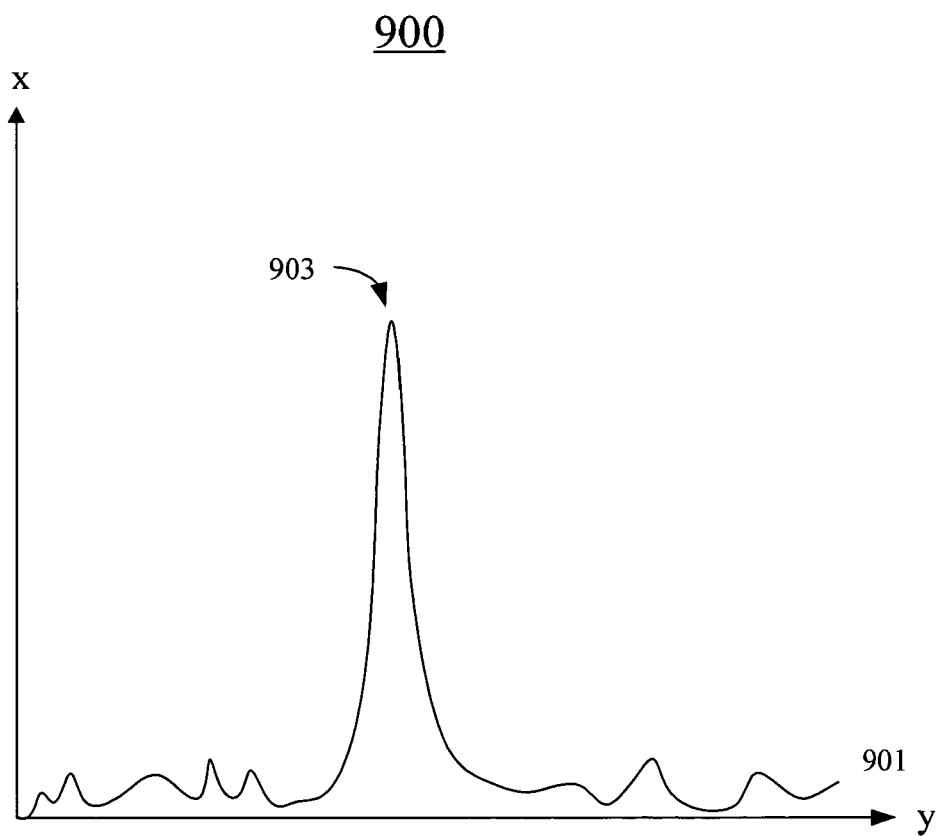
FIG. 16 is a graph of an exemplary result from an application of the disclosed subject matter.

Control then proceeds to an "Images Match?" block 861 during which process 850 examines the resultant graph 900 produced during block 859. A signal representing an exemplary match is shown in FIG. 16. If the image processed in block 855 match the image retrieved in block 857 then control proceeds to a "Signal Result" block 865 during which process 850 signals that a match has been detected. Control then proceeds to an "End Match Images" block 879 in which process 850 is complete.

If, in block 861, process 850 determines the images do not match, then control proceeds to a "More Stored Images" block 863 during which process 850 determines whether or not there are more stored images that can be compared to the image processed in 855. If not, control proceeds to Signal Result block 865 during which process 850 signals that a match has not been found. Control then proceeds to End Match Images block 879 as explained above.

If, in block 863, process 850 determines that there are more images to compare, then control returns to Retrieve Stored Image block 857 during which the next image is retrieved and processing continues as explained above.

According to the claimed subject matter, convolutions in the non-compact and compact realizations are defined for different subgroups of the group SL(2,C). The convolution in the noncompact realization is defined above for the subgroup of dilations and in-image rotations, while the convolution in compact realization is defined fore the subgroup of all 3-dimensional (3-D) rotations. As the standard Fourier convolution is used to recognize patterns undergoing translations, each of the noncompact and compact projective Fourier convolutions disclosed herein is employed to recognize patterns that undergo the corresponding image transformations. It should be noted that dilations can be combined with 3-D rotations to recognize patterns (or objects containing an identifiable piece of a planar surface) by applying the compact convolution property to the family of compact convolutions.

$$\rho_i \to C_{f_1} f_2(\rho,\vec{z}) = f_1 * f_2(\rho,\vec{z})$$

where $\rho_i > 0$.

FIG. 16 is a graph of an exemplary graph 900 from an application of the disclosed subject matter showing the result of two images that have been determined by process 850 (FIG. 15) to match. Graph 900 includes a plot 901 in a x and y axis. A peak 903 indicates that the two images that have produced plot 901 actually are a close match.

While various embodiments of the application have been described, it will be apparent to those of ordinary skill in the art that many more embodiments and implementations are possible that are within the scope of this invention. For example, certain steps of processes 800 and 850 may be removed or modified if the images are captured by a log-polar camera to begin with.

APPENDIX A

To derive the expressions in (4), $z' = x'_3 + ix'_1$ in (3) is written by using standard trigonometric identities, as follows:

$$z' = x'_3 + ix'_1$$

$$= \frac{(x_3 + ix_1)\cos\frac{\phi}{2} - i\sin\frac{\phi}{2}}{-i(x_3 + ix_1)\sin\frac{\phi}{2} + \cos\frac{\phi}{2}}$$

$$= \frac{\left[(x_3 + ix_1)\cos\frac{\phi}{2} - i\sin\frac{\phi}{2}\right]\left[i(x_3 - ix_1)\sin\frac{\phi}{2} + \cos\frac{\phi}{2}\right]}{[(x_3)^2 + (x_1)^2]\sin^2\frac{\phi}{2} + x_1\sin\phi + \cos^2\frac{\phi}{2}}$$

$$= \frac{x_3 + \frac{i}{2}[((x_3)^2 + (x_1)^2)\sin\phi + 2x_3\cos\phi - \sin\phi]}{\frac{1}{2}[(x_3)^2 + (x_1)^2](1 - \cos\phi) + x_1\sin\phi + \frac{1}{2}(\cos\phi - 1)},$$

from which we easily obtain the real and imaginary parts of (3) as given in (4).

Given pattern $f: D \to R$. To remove the conformal distortions generated by (3) in $f(g^{-1} \cdot z)$, we first recall that $z \in D \subset C$ ($z = x_3 + ix_1$ is identified with $(x_1, 1, x_3)$) is mapped to $s = \sigma^{-1}(z) \in S^2_{(0,1,0)}$ by the inverse of the stereographic projection $\sigma = j|_{S^2_{(0,1,0)}}$, which is conformal, the sphere is rotated about its center by $\phi$, and the rotated image s' of s is projected back to the image plane giving z' expressed in (3). We choose some image point $\eta = b + ia$ and continue the projection of z from s to r on the plane $T_p$ tangent to $S^2_{(0,1,0)}$ at $$p = (P_1, p_2, p_3) = \sigma^{-1}(\eta) = (a^2 + b^2 + 1)^{-1}(2a, 2, 2b). \quad (21)$$

Then, after the sphere is rotated as shown in FIG. 1, the rotated point r, denoted by r' in $T_{p'}$, is projected back to the image plane, giving z". Therefore, f(z') and f(z") are the intensities of the projectively (with conformal distortions) and perspectively (without conformal distortions) transformations of the original pattern f(z). To complete the deconformalization process, we need to find z".

To this end, the vector $\vec{n} = \langle p_1(p_2-1), p_3 \rangle$ normal to the sphere $S_{(0,1,0)}^2$ (the sphere with the equation $y_1^2 + (y_2-1)^2 + y_3^2 = 1$) at p gives the following equation of the tangent plane $T_p$:

$$p_1(y_1 - p_1) + (p_2 - 1)(y_2 - p_2) + p_3(y_3 - p_3) = 0.$$

Using this equation, we find t such that $(y_1,y_2,y_3)=(x_1 1,x_3)$ $t=r\in T_{p_2}$. The result is $t=p_2/(p_1x_1+p_2-1+p_3x_3)$. Next, we rotate $S_{(0,1,0)}^2$ by the angle θ, as shown in FIG. 1, to obtain r' as follows:

$$r' = \begin{pmatrix} \cos\phi & \sin\phi & 0 \\ -\sin\phi & \cos\phi & 0 \\ 0 & 0 & 1 \end{pmatrix} \begin{pmatrix} y_1 \\ y_2-1 \\ y_3 \end{pmatrix} + \begin{pmatrix} 0 \\ 1 \\ 0 \end{pmatrix} \quad (22)$$

Next, we find t' such that $(y'_1,y'_2,y'_3)=r't'$ belongs to the image plane 101 (using that $y'_2=1$ on the image plane 101). We obtain $t'=1/(-y_1 \sin\phi + y_2 \cos\phi + 1 - \cos\phi)$ where $y_1=p_2x_1/(p_1x_1+p_2-1+p_3x_3)$ and $y_2=p_2/(p_1x_1+p_2-1+p_3x_3)$. With this value of t', $r't'=z''=x''_3+ix''_1$. Finally, using (21) and taking for convenience −φ (these rotations for the given values transform the pattern's support again to the first quadrant (see FIGS. 8 and 9), we arrive at (5). The extension of (4) to general image projective transformations is not difficult.

APPENDIX B

[1] E. B. Barrett, P. M. Payton, M. H. Brill and N. N. Haag; *Invariants Under Image Perspective Transformations: Theory and Examples*; Int. J. Imaging Systems and Technol. 2, 1990, pp. 296-314.

[2] B. B. Bederson, R. S. Wallace and E. L. Schwartz; *A miniaturized space-variant active vision system: Cortex*-1; Machine Vision and Applications 8, 1995, pp. 101-109.

[3] J. A. Boluda, F. Pardo, T. Kayser, J. J. Perez and J. Pelechano; *A new foveated space-variant camera for robotic applications*; Proceedings of the IEEE Conference on Electronic, Circuits and Systems, held October 1996, Rhodes, Greece.

[4] G. Bonmassar and E. L. Schwartz; *Space-variant Fourier analysis: The exponential chirp transform*; IEEE Trans. Pattern Analysis Machine Intell., 19, 1997, pp. 1080-1089.

[5] A. J. W. Duijndam and M. A. Schonewille; *Nonuniform fast Fourier transform*; Geophysics 64, 1999, pp. 539-551.

[6] H. G. Feichtinger and T. Strohmer (Eds.); *Gabor Analysis and Algorithms*; Theory and Applications; Birkhäuser, 1998.

[7] J-P. Gauthier, G. Bornard and M. Silbermann; *Motions and Pattern Analysis: Harmonic Analysis on Groups and Their Homogeneous Spaces*; IEEE Trans. Syst. Man Cybernet. 21, 1991, pp. 149-172.

[8] F. Giulianini, M. Ferraro and T. M. Caelli; *Transformational Properties of Integral Transforms of Images*; J. Opt, Soc. Amer. A9, 1992, pp. 494-496.

[9] P. Henrici; Applied and Computational Complex Analysis, Vol. 3; John Wiley & Sons, 1986.

[10] D. H. Hubel; Eye, Brain, and Vision, New York: Scientific American Library, 1988.

[11] S. G. Mallat; *Multifrequency channel decomposition of images and wavelet models*; IEEE Trans. Acust., Speech, Signal Process. 37, 1989, pp. 2091-2110.

[12] R. Milanese, M. Cherbuliez and T. Pun; *Invariant content-based image retrieval using Fourier-Mellin transform*; Proceedings of ICAPR'98, Plymounth, UK, S. Singh (Ed.), Springer Verlag, 1999, pp. 73-82.

[13] J. L. Mundy and A. Zisserman (Eds.); Applications of Invariances in Computer Vision, MIT Press, 1992.

[14] D. G. Potts, Steidl and M. Tasche; *Fast Fourier transform for nonequispaced data: A tutorial*; in: J. J. Benedetto and P. Ferreira, Eds.; Modern Sampling Theory: Mathematics and Applications, pp. 253-274, Birkhäuser, 2000.

[15] G. Sandini, P. Questa, D. Scheffer, B. Dierickx and A. Mannucci (2000); *A retina-like CMOS sensors and its applications*; Proceedings of the 1st IEEE SAM Workshop, held Mar. 16-17, 2000, Cambridge, USA.

[16] E. L. Schwartz; *Spatial mapping in primate sensory projection: Analytical structure and relevance to perception*; Biological Cybernetics 25, 1997, pp. 181-194.

[17] L. S. Shapiro; Affine Analysis of Image Sequences, Cambridge University Press, 1995.

[18] J. Turski; *Harmonic Analysis on SL(2,C) and Projectively Adapted Pattern Representation*; J. Fourier Anal. Appl. 4, 1998, pp. 67-91.

[19] J. Turski; *Projective Fourier analysis in computer vision: Theory and computer simulations*; In: R. A. Malter, A. Y. Wu and L. J. Latecki, Eds.; SPIE Vol. 3168, Vision Geometry VI, 1997, pp. 124-135.

[20] J. Turski; *Projective Fourier analysis for patterns*; Pattern Recognition 33, 2000, pp. 2033-2043.

[21] J. Turski; *Geometric Fourier analysis of the conformal camera for active vision*; To appear in SIAM Review.

[22] M. Yeasin; *Optical Flow in Log-Mapped Image Plane—A New Approach*; IEEE Trans. Pattern Analysis Machine Intell. 24, 2002, pp. 125-131.

I claim:

1. A method of processing an image for pattern recognition and three-dimensional scene resolution, comprising:
    receiving a first digitized image; creating a first discrete projective Fourier transform (DPFT) image in log-polar coordinates of the first digitized image using a fast Fourier transform (FFT);
    storing the first DPFT image in a memory;
    projectively transforming the log-polar coordinates of the DPFT image; and
    computing an inverse DPFT image of the projectively transformed log-polar coordinates of the DPFT image using a non-uniform FFT to produce a projective transformation of the first digitized image.

2. The method of claim 1, the receiving a first digitized image comprising:
    capturing an analog image on an image plane; and
    digitizing the captured image.

3. The method of claim 1, wherein the digitized image is produced by a silicon retina.

4. The method of claim 1, further comprising:
    correcting the projective transformation for conformal distortions to obtain a an image perspective transformation.

5. The method of claim 1, further comprising:
    receiving a second digitized image;
    creating a second DPFT image in log-polar coordinates of the second digitized image using a FFT;
    producing a product by multiplying the first DPFT image and the second DPFT image;
    computing the an inverse DPFT of the product using FFT to create a projective convolution; and
    determining whether or not the first image is a projectively independent match of the second image based upon the projective convolution.

6. The method of claim 5, further comprising determining a physical location relative to a capture location of the first image based upon a determination of a projectively independent match between the first image and the second image.

7. A system processing an image for pattern recognition and three-dimensional scene resolution, comprising:
    a processor;
    a memory coupled to the processor;
    logic for receiving a first digitized image;

logic for creating a first discrete projective Fourier transform (DPFT) in log-polar coordinates of the first digitized image using a fast Fourier transform (FFT);

logic for storing the first DPFT image in the memory logic for projectively transforming the log-polar coordinates of the DPFT image; and logic for computing an inverse DPFT image of the projectively transformed log-polar coordinates of the DPFT image using a non-uniform FFT to produce a projective transformation of the first digitized image.

8. The system of claim 7, the logic for receiving a first digitized image comprising:

logic for capturing an analog image on an image plane; and logic for digitizing the captured image.

9. The system of claim 7, further comprising a silicon retina wherein the digitized image is produced by the silicon retina.

10. The system of claim 7, further comprising logic for correcting the image transformation for conformal distortions to obtain an image perspective transformation.

11. The system of claim 7, further comprising:

logic for receiving a second digitized image; logic for creating a second DPFT image in log-polar coordinates of the second digitized image using a FFT;

logic for producing a product by multiplying the first DPFT image and the second DPFT image;

logic for computing the an inverse DPFT of the product using FFT to create a projective convolution; and logic for determining whether or not the first image is a projectively independent match of the second image based upon the projective convolution.

12. The system of claim 11, further comprising logic for determining a physical location relative to a capture location of the first image based upon a determination of a projectively independent match between the first image and the second image.

13. A computer programming product for processing an image for pattern recognition and three-dimensional scene resolution, comprising:

a computer-readable memory;

logic, stored on the memory, for receiving a first digitized image;

logic, stored on the memory, for creating a first discrete projective Fourier transform (DPFT) in log-polar coordinates of the first digitized image using a fast Fourier transform (FFT);

logic, stored on the memory, for storing the first DPFT image in the memory logic, stored on the memory, for projectively transforming the log-polar coordinates of the DPFT image;

logic, stored on the memory, for computing an inverse DPFT image of the projectively transformed log-polar coordinates of the DPFT image using a non-uniform FFT to produce a projective transformation of the first digitized image.

14. The computer programming product of claim 13, the logic for receiving a first digitized image comprising:

logic, stored on the memory, for capturing an analog image on an image plane; and logic, stored on the memory, for digitizing the captured image.

15. The computer programming product of claim 13, further comprising logic, stored on the memory, for correcting the image transformation for conformal distortions to obtain a an image perspective transformation.

16. The computer programming product of claim 13, further comprising:

logic, stored on the memory, for receiving a second digitized image;

logic, stored on the memory, for creating a second DPFT image in log-polar coordinates of the second digitized image using a FFT;

logic, stored on the memory, for producing a product by multiplying the first DPFT image and the second DPFT image;

logic, stored on the memory, for computing the an inverse DPFT of the product using FFT to create a projective convolution; and logic, stored on the memory, for determining whether or not the first image is a projectively independent match of the second image based upon the projective convolution.

17. The computer programming product of claim 16, further comprising logic, stored on the memory, for determining a physical location relative to a capture location of the first image based upon determination of a projectively independent match between the first image and the second image.

* * * * *